(12) United States Patent
Massand

(10) Patent No.: US 8,977,697 B2
(45) Date of Patent: Mar. 10, 2015

(54) METHODS AND SYSTEMS FOR REMOVING METADATA FROM AN ELECTRONIC DOCUMENT ATTACHED TO A MESSAGE SENT FROM A MOBILE ELECTRONIC DEVICE

(71) Applicant: Litera Technology LLC, McLeansville, NC (US)

(72) Inventor: Deepak Massand, McLeansville, NC (US)

(73) Assignee: Litera Technology LLC, McLeansville, NC (US)

( * ) Notice: Subject to any disclaimer, the term of this patent is extended or adjusted under 35 U.S.C. 154(b) by 0 days.

(21) Appl. No.: 13/683,676

(22) Filed: Nov. 21, 2012

(65) Prior Publication Data

US 2013/0086692 A1   Apr. 4, 2013

Related U.S. Application Data

(63) Continuation of application No. 13/270,915, filed on Oct. 11, 2011, now abandoned, which is a continuation of application No. 13/018,509, filed on Feb. 1, 2011, now Pat. No. 8,060,575, which is a continuation of application No. 11/699,750, filed on Jan. 29, 2007, now Pat. No. 7,895,276.

(51) Int. Cl.
| | |
|---|---|
| *G06F 15/16* | (2006.01) |
| *H04L 29/06* | (2006.01) |
| *G06Q 10/10* | (2012.01) |
| *H04L 12/58* | (2006.01) |

(52) U.S. Cl.
CPC ......... *H04L 63/0428* (2013.01); *G06Q 10/107* (2013.01); *H04L 12/583* (2013.01); *H04L 51/063* (2013.01); *H04L 51/00* (2013.01)
USPC .......................................... 709/206; 709/204

(58) Field of Classification Search
USPC .......................... 709/204–207; 707/694–695; 715/229–231
See application file for complete search history.

(56) References Cited

U.S. PATENT DOCUMENTS

| | | | |
|---|---|---|---|
| 3,920,895 | A | 11/1975 | Vieri et al. |
| 3,920,896 | A | 11/1975 | Bishop et al. |
| 5,008,853 | A | 4/1991 | Bly et al. |
| 5,129,082 | A | 7/1992 | Tirfing et al. |
| 5,146,552 | A | 9/1992 | Cassoria et al. |
| 5,204,947 | A | 4/1993 | Bernstein et al. |
| 5,321,505 | A | 6/1994 | Leddy |
| 5,341,469 | A | 8/1994 | Rossberg et al. |
| 5,515,491 | A | 5/1996 | Bates et al. |
| 5,539,871 | A | 7/1996 | Gibson |

(Continued)

OTHER PUBLICATIONS

Co-pending U.S. Appl. No. 11/444,140, filed May 30, 2006, to Deepak Massand, entitled "Method of Compound Document Comparison".

(Continued)

*Primary Examiner* — Bharat N Barot
(74) *Attorney, Agent, or Firm* — Finnegan, Henderson, Farabow, Garrett & Dunner, LLP

(57) ABSTRACT

A method and system for removing metadata from email attachments sent from mobile devices includes receiving an email with an attached document. The attached document has metadata removed to create a cleansed version of the attached document. The attached document is replaced by the cleansed version of the attached document, and the email is sent according to the address or addresses included in the email.

30 Claims, 4 Drawing Sheets

(56) References Cited

U.S. PATENT DOCUMENTS

| | | | |
|---|---|---|---|
| 5,596,700 A | 1/1997 | Darnell et al. |
| 5,596,705 A | 1/1997 | Reimer et al. |
| 5,659,676 A | 8/1997 | Redpath |
| 5,664,208 A | 9/1997 | Pavley et al. |
| 5,669,005 A | 9/1997 | Curbow et al. |
| 5,671,428 A | 9/1997 | Muranaga et al. |
| 5,694,544 A | 12/1997 | Tanigawa et al. |
| 5,706,452 A | 1/1998 | Ivanov |
| 5,706,502 A | 1/1998 | Foley et al. |
| 5,708,826 A | 1/1998 | Ikeda et al. |
| 5,708,845 A | 1/1998 | Wistendahl et al. |
| 5,740,444 A | 4/1998 | Frid-Nielsen |
| 5,752,055 A | 5/1998 | Redpath et al. |
| 5,758,313 A | 5/1998 | Shah et al. |
| 5,761,419 A | 6/1998 | Schwartz et al. |
| 5,761,499 A | 6/1998 | Sonderegger |
| 5,781,732 A | 7/1998 | Adams |
| 5,781,901 A | 7/1998 | Kuzma |
| 5,787,175 A | 7/1998 | Carter |
| 5,799,191 A | 8/1998 | Moriyasu et al. |
| 5,801,702 A | 9/1998 | Dolan et al. |
| 5,809,512 A | 9/1998 | Kato |
| 5,860,073 A | 1/1999 | Ferrel et al. |
| 5,864,870 A | 1/1999 | Guck |
| 5,870,754 A | 2/1999 | Dimitrova et al. |
| 5,878,421 A | 3/1999 | Ferrel et al. |
| 5,890,177 A | 3/1999 | Moody et al. |
| 5,893,126 A | 4/1999 | Drews et al. |
| 5,911,776 A | 6/1999 | Guck |
| 5,931,906 A | 8/1999 | Fidelibus, Jr. et al. |
| 5,937,066 A | 8/1999 | Gennaro et al. |
| 5,938,724 A | 8/1999 | Pommier et al. |
| 5,944,785 A | 8/1999 | Pommier et al. |
| 5,949,413 A | 9/1999 | Lerissa et al. |
| 5,950,214 A | 9/1999 | Rivette et al. |
| 5,956,736 A | 9/1999 | Hanson et al. |
| 5,958,006 A | 9/1999 | Eggleston et al. |
| 5,978,836 A | 11/1999 | Ouchi |
| 5,987,469 A | 11/1999 | Lewis et al. |
| 6,009,462 A | 12/1999 | Birrell et al. |
| 6,014,135 A | 1/2000 | Fernandes |
| 6,029,171 A | 2/2000 | Smiga et al. |
| 6,064,751 A | 5/2000 | Smithies et al. |
| 6,067,551 A | 5/2000 | Brown et al. |
| 6,073,142 A | 6/2000 | Geiger et al. |
| 6,088,709 A | 7/2000 | Watanabe |
| 6,119,147 A | 9/2000 | Toomey et al. |
| 6,158,903 A | 12/2000 | Schaeffer et al. |
| 6,178,431 B1 | 1/2001 | Douglas |
| 6,182,080 B1 | 1/2001 | Clements |
| 6,212,534 B1 | 4/2001 | Lo et al. |
| 6,243,722 B1 | 6/2001 | Day et al. |
| 6,289,460 B1 | 9/2001 | Hajmiragha |
| 6,317,777 B1 | 11/2001 | Skarbo et al. |
| 6,334,141 B1 | 12/2001 | Varma et al. |
| 6,336,134 B1 | 1/2002 | Varma |
| 6,343,313 B1 | 1/2002 | Salesky et al. |
| 6,360,236 B1 | 3/2002 | Khan et al. |
| 6,363,352 B1 | 3/2002 | Dailey et al. |
| 6,411,989 B1 | 6/2002 | Anupam et al. |
| 6,560,637 B1 | 5/2003 | Dunlap et al. |
| 6,590,584 B1 | 7/2003 | Yamaura et al. |
| 6,643,663 B1 | 11/2003 | Dabney et al. |
| 6,681,371 B1 | 1/2004 | Devanbu |
| 6,687,878 B1 | 2/2004 | Eintracht et al. |
| 6,708,172 B1 | 3/2004 | Wong et al. |
| 7,103,915 B2 | 9/2006 | Redlich et al. |
| 7,113,948 B2 | 9/2006 | Jhingan et al. |
| 7,212,814 B2 | 5/2007 | Wilson et al. |
| 7,251,680 B2 | 7/2007 | DeVos |
| 7,424,513 B2 * | 9/2008 | Winjum et al. ............... 709/206 |
| 7,570,964 B2 | 8/2009 | Maes |
| 7,623,515 B2 | 11/2009 | Breuer et al. |
| 7,640,308 B2 | 12/2009 | Antonoff et al. |
| 7,895,166 B2 | 2/2011 | Foygel et al. |
| 7,895,276 B2 | 2/2011 | Massand |
| 8,060,575 B2 | 11/2011 | Massand |
| 8,065,424 B2 * | 11/2011 | Foresti et al. ................. 709/206 |
| 2001/0037367 A1 | 11/2001 | Iyer |
| 2002/0049786 A1 | 4/2002 | Bibliowicz et al. |
| 2002/0059342 A1 | 5/2002 | Gupta et al. |
| 2002/0059343 A1 | 5/2002 | Kurishima et al. |
| 2002/0065848 A1 | 5/2002 | Walker et al. |
| 2002/0078088 A1 | 6/2002 | Kuruoglu et al. |
| 2002/0085030 A1 | 7/2002 | Ghani |
| 2002/0091741 A1 | 7/2002 | Ferreira et al. |
| 2002/0107886 A1 | 8/2002 | Gentner et al. |
| 2002/0143691 A1 | 10/2002 | Ramaley et al. |
| 2003/0112273 A1 | 6/2003 | Hadfield et al. |
| 2003/0145017 A1 | 7/2003 | Patton et al. |
| 2003/0158855 A1 | 8/2003 | Farnham et al. |
| 2003/0197730 A1 | 10/2003 | Kakuta et al. |
| 2004/0085354 A1 | 5/2004 | Massand |
| 2004/0203947 A1 | 10/2004 | Moles |
| 2004/0205653 A1 | 10/2004 | Hadfield et al. |
| 2005/0060375 A1 * | 3/2005 | Ernest et al. .................. 709/206 |
| 2006/0069733 A1 | 3/2006 | Antonoff et al. |
| 2006/0089931 A1 | 4/2006 | Giacobbe et al. |
| 2006/0167879 A1 | 7/2006 | Umeki et al. |
| 2006/0253482 A1 | 11/2006 | Zellweger et al. |
| 2007/0016613 A1 | 1/2007 | Foresti et al. |
| 2007/0067397 A1 | 3/2007 | Tran |
| 2007/0143425 A1 * | 6/2007 | Kieselbach et al. .......... 709/206 |
| 2007/0186157 A1 | 8/2007 | Walker et al. |
| 2008/0162652 A1 | 7/2008 | True et al. |
| 2008/0183824 A1 | 7/2008 | Chen et al. |
| 2008/0215509 A1 | 9/2008 | Charlton |
| 2008/0280633 A1 * | 11/2008 | Agiv ............................ 455/466 |
| 2013/0254528 A1 * | 9/2013 | Brown et al. ................. 709/206 |

OTHER PUBLICATIONS

Co-pending U.S. Appl. No. 12/406,093, filed Mar. 17, 2009, to Deepak Massand, entitled "System and Method for the Comparison of Content Within Tables Separate From Form and Structure".

Co-pending U.S. Appl. No. 12/350,144, filed Jan. 7, 2009, to Deepak Massand, entitled "System and Method for Comparing digital Data in spreadsheets or Database Tables".

"Service Support Offerings Professional & Learning Services"; Clearswift Services (12 pages).

"Think Your Deletions Are Gone Forever? Think Again! ezClean™ Makes Metadata Removal Easy!"; Kraft & Kennedy Lesser; dated Jul. 27, 2004. (1 page).

"Think Your Deletions Are Gone Forever? Think Again! ezClean™ Makes Metadata Removal Easy!"; Kraft & Kennedy Lesser; dated Apr. 5, 2005. (1 page).

"Think Your Deletions Are Gone Forever? Think Again! ezClean™ Makes Metadata Removal Easy!"; Kraft & Kennedy Lesser; dated Mar. 17, 2005. (1 page).

"User's Guide by KKL Software"; ezClean Version 3.1 (15 pages).

"Installation Guide and Admin Manual by KKL Software"; ezClean Version 3.0.x (14 pages).

"Installation Guide and Admin Manual by KKL Software"; ezClean; Version 3.3 (34 pages).

"Integration Guide for use with CS MailSweeper for SMTP"; ezClean; Version 3.3; KKL Software (15 pages).

"BETA Program Agreement" (4 pages).

"How do I make sure that there is no embarrassing Metadata in any documents that I attach to e-mails?"; KKL Software (2 pages).

"How do I remove metadata from documents that I attach to e-mails?"; KKL Software (1 page).

Beta Program Guide; "MAILsweeper for SMTP 4.3" (5 pages).

Beta Program Qualification Form; "MAILsweeper for SMTP 4.3" (4 pages).

Forrester et al., "An Investigation Into Unintentional Information Leakage Through Electronic Publication," Information and Computer Security Architecture, http://icsa.cs.up.ac.za/issa/2005/Proceedings/Poster/012_Article.pdf (2005).

Lonvick, RFC 3164, "The BSD Syslog Protocol" (Aug. 2001).

Aura et al., "Scanning Electronic Documents for Personally Identifiable Information," WPES '06 (2006).

(56) References Cited

OTHER PUBLICATIONS

Plaintiff Workshare Technology, Inc.'s Preliminary Invalidity Contentions, *Workshare Technology, Inc. v. Litera Technology LLC*, Civil Action No. 1-11-Cv-00825-Jab-Pts (M.D. N.C. Mar. 26, 2012).
Exhibit 1 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '276 Patent relative to Antonoff.
Exhibit 2 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '276 Patent relative to Maes.
Exhibit 3 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '276 Patent relative to Foygel.
Exhibit 4 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '276 Patent relative to 3BClean.
Exhibit 5 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '276 Patent relative to Bitform's Secure SDK System.
Exhibit 6 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '276 Patent relative to the EZClean System.
Exhibit 7 to Plaintiff Workshare Technology, Inc.'s Preliminary Invalidity Contentions, *Workshare Technology, Inc. v. Litera Technology LLC*, Civil Action No. 1:11-CV00825-Jab-Pts (M.D. N. C. Mar. 26, 20-12)-Claim Chart of '276 Patent relative to the EZClean System.
Exhibit 10 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '276 Patent relative to the DEMO Fall 2005 Conference.
Exhibit 11 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart of '276 Patent relative to the State of the Art.
Exhibit 12 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '575 Patent relative to Antonoff.
Exhibit 13 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart of '575 Patent relative to Maes.
Exhibit 14 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart of '575 Patent relative to Foygel.
Exhibit 15 to Plaintiff Workshare Technology, Inc.'s Preliminary Invalidity Contentions, *Workshare Technology, Inc. v. Litera Technology LLC*, Civil Action No. 1:11-CV00825-Jab-Pts (M.D. N. C. Mar. 26, 20-12)-Claim Chart of '575 Patent relative to the 3BClean System.
Exhibit 16 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '575 Patent relative to Bitform's Secure SKD System.
Exhibit 17 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart of '575 Patent relative to the EZClean System.
Exhibit 19 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart '575 Patent relative to the DEMOfall 2005 Conference.
Exhibit 20 to Plaintiff Workshare Technology, Inc.'s Preliminary Invalidity Contentions, *Workshare Technology, Inc. v. Litera Technology LLC*, Civil Action No. 1:11-CV00825-JAB-PTS (M.D. N. C. Mar. 26, 20-12)-Claim Chart of '575 Patent relative to the State of the Art.
3BView: 3BOpenDoc, http://opendocument.kml.org/node/170 (2006).
3BClean: Clean Metadata from Documents, www.3bview.com/pp./3bclean.php (2005).
3BClean Secure Document Exchange, www.3bview.com/pp./index.php (2005).
3BView Secure Document Exchange, "Clean Metadata from Documents with 3BClean", www.3bview.com/3bclean.html (2005).
3BView Secure Document Exchange, "Features and Benefits of 3BClean", www.3bview.com/3bclean-features.html (2006).
3BView Secure Document Exchange, "Automatic Cleaning of Email Attachments", www.3bview.com/3bclean-email.html (2006).
3BView Secure Document Exchange, "Technical Overview of 3BClean", www.3bview.com/3bclean-tech.html (2006).
3BView Secure Document Exchange Literature, "Controlling Document Metadata," (2005).
3BView Secure Document Exchange, "3B Transform", www.3bview.com/3btran.html (2006).
3BView Secure Document Exchange, "Clean Metadata from Documents with 3BClean", www.3bview.com/3bclean.html (2006).
3BView Secure Document Exchange, 3BOpenDoc—Covert Documents to and from ODF (Open Document Format), www.3bview.com/3opendoc_convert_ODF.html (2006).
3BView Secure Document Exchange, "3BOpen Doc: Making StarOffice and OpenOffice.org a Viable Option", www.3bview.com/3bopendoc.html (2006).
3BView Secure Document Exchange, "Solving Business Challenges Across Industries," www.3bview.com/3bclean-challenges.html (2006).
Summary, 3BClean Activity 2005—Jan. 2007 (2011).
J. Shaw, "Litera Patent US 7,895,276 B2 (Argument for Prior Art)" Version 1.3, (2011).
3BView.com Website 2005-2006, www.3bview.com (2006).
Bitform Secure SDK 2005.1, www.bitform.net/products/securesdk/ (2005).
Bitform Extract Sdk 2005.1, www.bitform.net/products/extractsdk/ (2005).
Bitform Secure SDK 2005.2, www.bitform.net/products/securesdk/ (2006).
Bitform Secure SDK 2005.1, www.bitform.net/products/extractsdk/ (2006).
Kraft, Kenney & Lesser, "Think Your Deletions Are Gone Forever? Think Again!". http://www.kklsoftware.com (2004).
Clearswift™, "CS MAILsweeper™ 4.3 for SMTP: Frequently Asked Questions" (2002).
Clearswift™, "CS MAILsweeper™4.3 for SMTP: Evaluation Guide" (2002).
Clearswift™, "CS MAILsweeper for SMTP Version 4.3 New Features Guide" (2002).
Clearswift MIMEsweeper™, "CS MAILsweeper 4.3 for SMTP: Effective e-Policy implementation to analyze, protect and manage incoming and outgoing email at the Internet gateway" (2002).
Workshare Press Release, "Workshare Delivers Groundbreaking Document Hygiene Technology to Individual Users and Small Business" (Nov. 10, 2005).
Workshare Press Release, "Workshare Project Enterprise Debuts Policy Management for Microsoft Windows Rights Management Services at RSA Conference" (Feb. 15, 2006).

(56) References Cited

OTHER PUBLICATIONS

Workshare Press Release, "Workshare Unveils the Workshare Protect Enterprise Suite to Cure Information Leakage Without Crippling Business" (Feb. 6, 2006).
Workshare Press Release, "Workshare Selected to Present at DEMOfall 2005" (Aug. 23, 2005).
Workshare Press Release, "Workshare Previews Groundbreaking Document Security Technology at DEMOfall 2005" (Sep. 20, 2005).
RSA 2006: Product Announcements, http://searchsecurity.techtarget.com/feature/RSA-2006-Product-announcements (2006).
RSA Conference 2006, http://searchsecurity.techtarget.com/feature/RSA-Conference-2006 (2006).
Workshare Press Release, "Workshare Protect Mobile Delivers Industry's First Complete Mobile Workforce Data Loss Prevention Solution" (2006).
Workshare Technology, Inc.'s Expert Report of Michael J. Freedman, Ph.D., Regarding Invalidity of U.S. Patents 7,895,276 and 8,060,575, pp. 1-12, 17-58, 71-112, Exs. A and B, *Workshare Technology, Inc.* v. *Litera Technologies LLC*, Civil Action No. 1-11-Cv-00825-JAB-JEP (M.D. N. C. (Apr. 4, 2013).
Appendix 1 to Freedman Expert Report—Claim Chart '276 Patent relative to Antonoff.
Appendix 2 to Freedman Expert Report—Claim Chart of '276 Patent relative to Maes.
Appendix 3 to Freedman Expert Report—Claim Chart of '276 Patent relative to Foygel.
Appendix 4 to Freedman Expert Report—Claim Chart of '276 Patent relative to the 3BClean System.
Appendix 5 to Freedman Expert Report—Claim Chart of '276 Patent relative to Bitform's Secure SDK System.
Appendix 6 to Freedman Expert Report—Claim Chart of '276 Patent relative to the EZClean System.
Appendix 7 to Freedman Expert Report—Claim Chart of '276 Patent relative to Bitform's Secure SDK System (Source Code).
Appendix 10 to Freedman Expert Report—Claim Chart of '276 Patent relative to Workshare DEMOfall 2005 demonstration.
Appendix 11 to Freedman Expert Report—Claim Chart of '276 Patent relative to the State of the Art.
Appendix 12 to Freedman Expert Report—Claim Chart of '276 Patent relative to Antonoff.
Appendix 13 to Freedman Expert Report—Claim Chart of '575 Patent relative to Maes.
Appendix 14 to Freedman Expert Report—Claim Chart '575 Patent relative to Foygel.
Appendix 15 to Freedman Expert Report—Claim Chart of '575 Patent relative to the 3BClean System.
Appendix 16 to Freedman Expert Report—Claim Chart of '575 Patent relative to Bitform's Secure SDk System (20 pages).
Appendix 17 Freedman Expert Report—Claim Chart of '575 Patent relative to the ezClean System.
Appendix 19 to Freedman Expert Report—Claim Chart of '575 Patent relative to the Workshare System Demonstration at the DEM0fall 2005 Conference.
Appendix 20 to Freedman Expert Report—Claim Chart of '575 Patent relative to the State of the Art.
Stipulation of Dismissal with Prejudice in *Workshare Technology, Inc.* v. *Litera Technologies LLC*, Civil Action No. 1-11-CV-00825-JAB-JEP (M.D. N. C. Sep. 2, 2014).
Workshare Technology, Inc.'s Objections and Responses to Defendant Litera Technologies, LLC's Interrogatories, Set Three (Nos. 3-9) (Sep. 27, 2012).
Workshare Technology Inc.'s Brief in Support of its Motion for Summary Judgment that the Asserted Claims of the Patents-in-Suit are Invalid Under 35 U.S.C. §§ 102 and 103, *Workshare Technology, Inc.* v. *Litera Technologies LLC*, Civil Action No. 1-11- CV-00825-JAB-JEP (M.D. N. C. Jul. 12, 2013).
Declaration of Christopher Kao in Support of Workshare Technology, Inc.'s Motion for Summary Judgment that the Asserted Claims of the Patents-In-Suit are Invalid Under 35 U.S.C. §§ 102 and 103, *Workshare Technology, Inc.* v. *Litera Technologies LLC*, Civil Action No. 1-11-CV-00825-JAB-JEP (M.D. N. C.) (Jul. 12, 2013).
Exhibit 3 to Kao Declaration in Support of Workshare Technology, Inc.'s Motion for Summary Judgment, Examination Before Trial of Marcus Bluestein, *Workshare Technology, Inc.* v. *Litera Technologies LLC*, Civil Action No. 1-11-CV-00825-JAB-JEP (M.D. N. C.) (Apr. 5, 2013).
Exhibit 4 to Kao Declaration in Support of Workshare Technology, Inc.'s Motion for Summary Judgment, KKL Software: Think Your Deletions Are Gone Forever? http://web.archive.org/web/20040727132558/http:/www.kklsoftware.com (2004).
Exhibit 5 to Kao Declaration in Support of Workshare Technology, Inc.'s Motion for Summary Judgment, Affidavit of Christopher Butler, (Jun. 21, 2013).
Exhibit 6 to Kao Declaration in Support of Workshare Technology, Inc.'s Motion for Summary Judgment, KKL Software: ezClean makes it easy!, http://web.archive.org/web/20040727132558/http:/www.kklsoftware.com (2004).
Exhibit 7 to Kao Declaration in Support of Workshare Technology, Inc.'s Motion for Summary Judgment, ezClean Integration Guide v3.3.
Exhibit 8 to Kao Declaration in Support of Workshare Technology, Inc.'s Motion for Summary Judgment, Excerpt of Deposition of Dr. Martin William Brown (May 21, 2013).
Exhibit 9 to Kao Declaration in Support of Workshare Technology, Inc.'s Motion for Summary Judgment, 3BClean: Secure Document Exchange, http://web.archive.org/web/20051201012525.http://www.3bview.com/pp./index.php (2005).
Exhibit 10 to Kao Declaration in Support of Workshare Technology, Inc.'s Motion for Summary Judgment, Silver et al. "Plan to Deal with Metadata Issues with Windows Vista" (Dec. 21, 2006).
Exhibit 11 to Kao Declaration in Support of Workshare Technology, Inc.'s Motion for Summary Judgment, 3BClean: What is the problem?, http://web.archive.org/web/20051216102451.http://www.3bview.com/pp./3bclean.php (2005).
Exhibit 12 to Kao Declaration in Support of Workshare Technology, Inc.'s Motion for Summary Judgment, E-mail correspondence (Jun. 20, 2003).
Exhibit 13 to Kao Declaration in Support of Workshare Technology, Inc.'s Motion for Summary Judgment, E-mail correspondence (Dec. 16, 2003).
Exhibit 14 to Kao Declaration in Support of Workshare Technology, Inc.'s Motion for Summary Judgment, E-mail correspondence (Jan. 9, 2004).
Exhibit 15 to Kao Declaration in Support of Workshare Technology, Inc.'s Motion for Summary Judgment, E-mail correspondence (Sep. 28, 2004).
Exhibit 16 to Kao Declaration in Support of Workshare Technology, Inc.'s Motion for Summary Judgment, Excerpt of Deposition of Workshare Technology, Inc. 30(b)(6) Matthew Brown (Apr. 16, 2013).
Exhibit 17 to Kao Declaration in Support of Workshare Technology, Inc.'s Motion for Summary Judgment, Excerpt of Deposition of Workshare Technology, Inc. 30(b)(6) Matthew Brown (Apr. 17, 2013).
Exhibit 18 to Kao Declaration in Support of Workshare Technology, Inc.'s Motion for Summary Judgment, Workshare Press Release, "Workshare Previews Groundbreaking Document Security Technology at DEMOfall 2005" (Sep. 20, 2005).
Exhibit 19 to Kao Declaration in Support of Workshare Technology, Inc.'s Motion for Summary Judgment, Excerpt of Litera Technologies, Inc.'s Expert Rebuttal Report of John Guyer (May 22, 2013).
Exhibit 20 to Kao Declaration in Support of Workshare Technology, Inc.'s Motion for Summary Judgment, Litera Technologies, LLC's Supplemental Response to Workshare Technology Inc.'s Interrogatory No. 4, *Workshare Technology, Inc.* v. *Litera Technologies LLC*, Civil Action No. 1-11-CV-00825-JAB-JEP (M.D. N. C.) (May 29, 2012).
Exhibit 21 to Kao Declaration in Support of Workshare Technology, Inc.'s Motion for Summary Judgment, Excerpt of Deposition of Deepak Massand (Apr. 22, 2013).

(56) References Cited

OTHER PUBLICATIONS

Exhibit 22 to Kao Declaration in Support of Workshare Technology, Inc.'s Motion for Summary Judgment, S. Ferrara, "Blackberry Communication Flow" (2004).
Exhibit 24 to Kao Declaration in Support of Workshare Technology, Inc.'s Motion for Summary Judgment, Excerpt of Deposition of John Guyer (Jun. 25, 2013).
Exhibit 25 to Kao Declaration in Support of Workshare Technology, Inc.'s Motion for Summary Judgment, Workshare DEMOfall 2005 demonstration screenshots.
Exhibit 26 to Kao Declaration in Support of Workshare Technology, Inc.'s Motion for Summary Judgment, Workshare Technology, Inc.'s Expert Report of Michael J. Freedman, Ph.D., Regarding Invalidity of U.S. Patents 7,895,276 and 8,060,575, *Workshare Technology, Inc. v. Litera Technologies LLC*, Civil Action No. 1-11-CV-00825-JAB-JEP (M.D. N. C. (Apr. 4, 2013), including Exhibit A, Exhibit B, and Appendices 4, 6, 8, 15, 17, and 18.
Exhibit 27 to Kao Declaration in Support of Workshare Technology, Inc.'s Motion for Summary Judgment, Excerpt of Deposition of Mr. Barrie Hadfield (May 22, 2013).
Litera Technologies, Inc.'s Brief in Opposition to Workshare Technology Inc.'s Motion for Summary Judgment, *Workshare Technology, Inc. v. Litera Technologies LLC*, Civil Action No. 1-11-CV-00825-JAB-JEP (M.D. N. C. Aug. 12, 2013).
Declaration of John Guyer in Support of Litera Technologies, Inc.'s Brief in Opposition to Workshare Technology Inc.'s Motion for Summary Judgment, *Workshare Technology, Inc. v. Litera Technologies LLC*, Civil Action No. 1-11-CV-00825-JAB-JEP (M.D. N. C. (Aug. 12, 2013).
Workshare Technology, Inc.'s Reply in Support of its Motion for Summary Judgment that the Asserted Claims of the Patents-in-Suit are Invalid Under 35 U.S.C. §§ 102 and 103, *Workshare Technology, Inc. v. Litera Technologies LLC*, Civil Action No. 1-11- CV-00825-JAB-JEP (M.D. N. C. (Aug. 26, 2013).
Litera Technologies, Inc.'s Motion for Leave to File Limited Surreply and for Oral Argument and Incorporated Memorandum of Law, *Workshare Technology, Inc. v. Litera Technologies LLC*, Civil Action No. 1-11-CV-00825-JAB-JEP (M.D. N. C. (Sep. 5, 2013).
Workshare Technology, Inc.'s Response in Opposition to Litera Technologies, LLC's Motion for Leave to File Limited Surreply, *Workshare Technology, Inc. v. Litera Technologies LLC*, Civil Action No. 1-11-CV-00825-JAB-JEP (M.D. N. C. (Sep. 27, 2013).
Memorandum Opinion and Order regarding claim construction, *Workshare Technology, Inc. v. Litera Technologies LLC*, Civil Action No. 1-11-CV-00825-JAB-PTS (M.D. N. C. Mar. 28, 2013).
Litera Technologies, LLC's, Opening Claim Construction Brief, *Workshare Technology, Inc. v. Litera Technologies LLC*, Civil Action No. 1-11-CV-00825-JAB-JEP (M.D. N. C. Nov. 13, 2012).
Declaration of Michael J. Thomas in Support of Litera Technologies, LLC's Opening Claim Construction Brief, *Workshare Technology, Inc. v. Litera Technologies LLC*, Civil Action No. 1-11-CV-00825-JAB-JEP (M.D. N. C. (Nov. 13, 2012).
Exhibit C to Thomas Declaration in Support of Litera Technologies, LLC's Opening Claim Construction Brief, Workshare Press Release, "Workshare Provides Server-based Metadata Removal for Leading Canadian Law Firm McMillan" (Dec. 1, 2010).
Exhibit E to Thomas Declaration in Support of Litera Technologies, LLC's Opening Claim Construction Brief, Letter from M. Thomas to P. Corrigan (Apr. 16, 2012).
Exhibit F to Thomas Declaration in Support of Litera Technologies, LLC's Opening Claim Construction Brief, Plaintiff Workshare Technology, Inc.'s Proposed Terms for Claim Construction (Apr. 16, 2012).
Exhibit G to Thomas Declaration in Support of Litera Technologies, LLC's Opening Claim Construction Brief, Defendant Litera Technologies, LLC's Preliminary Claim Constructions (Aug. 7, 2012).
Exhibit J to Thomas Declaration in Support of Litera Technologies, LLC's Opening Claim Construction Brief, Amendment in U.S. Appl. No. 11/699,750 (Feb. 16, 2009).
Exhibit H to Thomas Declaration in Support of Litera Technologies, LLC's Opening Claim Construction Brief, Plaintiff Workshare Technology, Inc.'s Preliminary Claim Constructions and Extrinsic Evidence (Aug. 7, 2012).
Workshare Technology, Inc.'s Responsive Claim Construction Brief, *Workshare Technology, Inc. v. Litera Technologies LLC*, Civil Action No. 1-11-CV-00825-JAB-PTS (M.D. N. C. Dec. 4, 2012).
Declaration of Christopher Kao in Support of Workshare Technology, Inc.'s Responsive Claim Construction Brief (Dec. 4, 2012).
Exhibit A to Kao Declaration in Support of Workshare Technology, Inc.'s Responsive Claim Construction Brief, KKL Software: ezClean makes it easy!, http://web.archive.org/web/20040727132558/http://www.kklsoftware.com (2004).
Exhibit B to Kao Declaration in Support of Workshare Technology, Inc.'s Responsive Claim Construction Brief, Kraft, Kenney & Lesser, "Think Your Deletions Are Gone Forever? Think Again!". http://www.kklsoftware.com (2004).
Exhibit C to Kao Declaration in Support of Workshare Technology, Inc.'s Responsive Claim Construction Brief, 3BView Secure Document Exchange Literature, "Controlling Document Metadata" (2005).
Exhibit D to Kao Declaration in Support of Workshare Technology, Inc.'s Responsive Claim Construction Brief, 3BClean Secure Document Exchange, www.3bview.com/pages/index.php (2005).
Exhibit E to Kao Declaration in Support of Workshare Technology, Inc.'s Responsive Claim Construction Brief, Workshare Press Release, "Workshare Updates Market Leading Solutions with Document 'Hygiene' Technology, Unicode Compliance and More" (Oct. 20, 2005).
Exhibit G to Kao Declaration in Support of Workshare Technology, Inc.'s Responsive Claim Construction Brief, Workshare Press Release, "Workshare Previews Groundbreaking Document Security Technology at DEMOfall 2005" (Sep. 20, 2005).
Exhibit F to Kao Declaration in Support of Workshare Technology, Inc.'s Responsive Claim Construction Brief, Litera Press Release, "Litera Announces Release of Medacte Providing Enterprise wide, Server-based Metadata Removal" (Aug. 18, 2011).
Exhibit I to Kao Declaration in Support of Workshare Technology, Inc.'s Responsive Claim Construction Brief, Amendment in U.S. Appl. No. 11/699,750 (Feb. 16, 2009).
Exhibit K to Kao Declaration in Support of Workshare Technology, Inc.'s Responsive Claim Construction Brief, the Authoritative Dictionary of IEEE Standards Terms 17 (7th ed. 2000).
Litera Technologies, LLC's, Reply to Workshare's Responsive Claim Construction Brief, *Workshare Technology, Inc. v. Litera Technologies LLC*, Civil Action No. 1-11-CV-00825-JAB-PTS (M.D. N. C. Dec. 14, 2012).
Supplemental Declaration of Michael J. Thomas in Support of Litera Technologies, LLC's, Reply to Workshare's Responsive Claim Construction Brief, *Workshare Technology, Inc. v. Litera Technologies LLC*, Civil Action No. 1-11-Cv-00825-JAB-PTS (M.D. N. C. Dec. 14, 2012).
Exhibit A to Supplemental Declaration of Michael J. Thomas in Support of Litera Technologies, LLC's, Reply to Workshare's Responsive Claim Construction Brief, ezClean Installation Guide and Admin Manual v.3.0.x.
Exhibit B to Supplemental Declaration of Michael J. Thomas in Support of Litera Technologies, LLC's, Reply to Workshare's Responsive Claim Construction Brief, Email correspondence (Feb. 27, 2009).
Email correspondence (Sep. 19, 2006).
Email correspondence (Sep. 21, 2006).

\* cited by examiner

METHODS AND SYSTEMS FOR REMOVING METADATA FROM AN ELECTRONIC DOCUMENT ATTACHED TO A MESSAGE SENT FROM A MOBILE ELECTRONIC DEVICE

This is a continuation of U.S. application Ser. No. 13/270,915, filed Oct. 11, 2011, which is a continuation of U.S. application Ser. No. 13/018,509, filed Feb. 1, 2011, now U.S. Pat. No. 8,060,575, which is a continuation of U.S. application Ser. No. 11/699,750, now U.S. Pat. No. 7,895,276, filed Jan. 29, 2007, all of which are incorporated herein by reference.

BACKGROUND

1. Field of the Invention

The field of the invention relates generally to systems and methods of providing security for data. More particularly, the preferred embodiment relates to electronic cleaning metadata from email attachments, which may be sent from webmail on Exchange or PDA, handheld or mobile devices such as Blackberry, Treo etc.

2. Related Background

Electronic documents often include metadata relating to changes or prior versions of the document which may not be readily apparent to a person viewing the document in an application. For example, a Word document may include history information which is not displayed to a person viewing the document using Word on a PC (or may not be displayed in all views of a document). This is true for other types of electronic documents, including PDFs, Excel Spreadsheets, etc. Additionally, electronic documents may include additional metadata concerning the document, such as when the document was created, who created the document, etc. While many users may not be concerned with such information, such information may include sensitive or proprietary information that a user, or others, may not wish to share when the electronic document is shared. For example, a user emailing an electronic document may wish not to share some information relating to the history or creation of the document (or the user's employer may wish the user did not share such information outside the company).

The problem of document metadata is made more complicated by the use of smart phones, PDAs, and other mobile devices which may be used to send email, including email with attachments.

Conventional email and document editing and creation systems allow users to share electronic documents, but also allow users to share documents with sensitive metadata. Many desktop based Metadata removal products exist today including Metadata Sweeper by Litera Corp®, Out of Sight by SoftWise™, Protect by Workshare™, Metadata Assistant by Payne Consulting™ and iScrub by Esquire Innovations™, etc. None of these products offer Metadata cleaning of Documents attached to emails sent from FDA, BlackBerry™, Palm Treo™ or other handheld devices. Accordingly, a need exists to reduce the chances of unwanted or unauthorized sharing of metadata, particularly in the context of sharing electronic documents with mobile communications devices.

Accordingly, a need exists to provide an improved system of preventing unwanted or unauthorized transmission of electronic documents with metadata.

SUMMARY

The present invention provides for a computer based system and method for removing metadata from a document attached to an email. An email sent from a mobile device is received by a gateway, email server, or other program. The email is analyzed to determine whether it has an attached document. In the event the email includes an attached document the attached document is analyzed to determine the nature of metadata in the document. If the attached document includes metadata the metadata may be cleaned, or the email and or the attachment may be analyzed to determine whether the metadata is to be removed. If the metadata is to be removed a cleaned version of the attached document is created with the metadata, or the desired portion of the metadata, removed. The attached document is replaced with the cleansed version of the attached document, and the email is sent according to the address (or addresses) included in the email (or other delivery instructions specified in either the email or at the gateway, email server or other program). A copy of the cleansed document may be retained. A person, for example a user or administrator, may be notified of the attempt to send a document with metadata, or a person may be given the option of allowing over-ride cleansing the metadata and sending the original attached document with the metadata. A log of all attachments that were cleaned of Metadata may be optionally saved for any desired duration.

DETAILED DESCRIPTION

The present invention is described in the context of a specific embodiment. This is done to facilitate the understanding of the features and principles of the present invention and the present invention is not limited to this embodiment. In particular, the present invention is described in the context of a computer system used to compare, edit, view and/or modify electronic documents.

Figure 1:
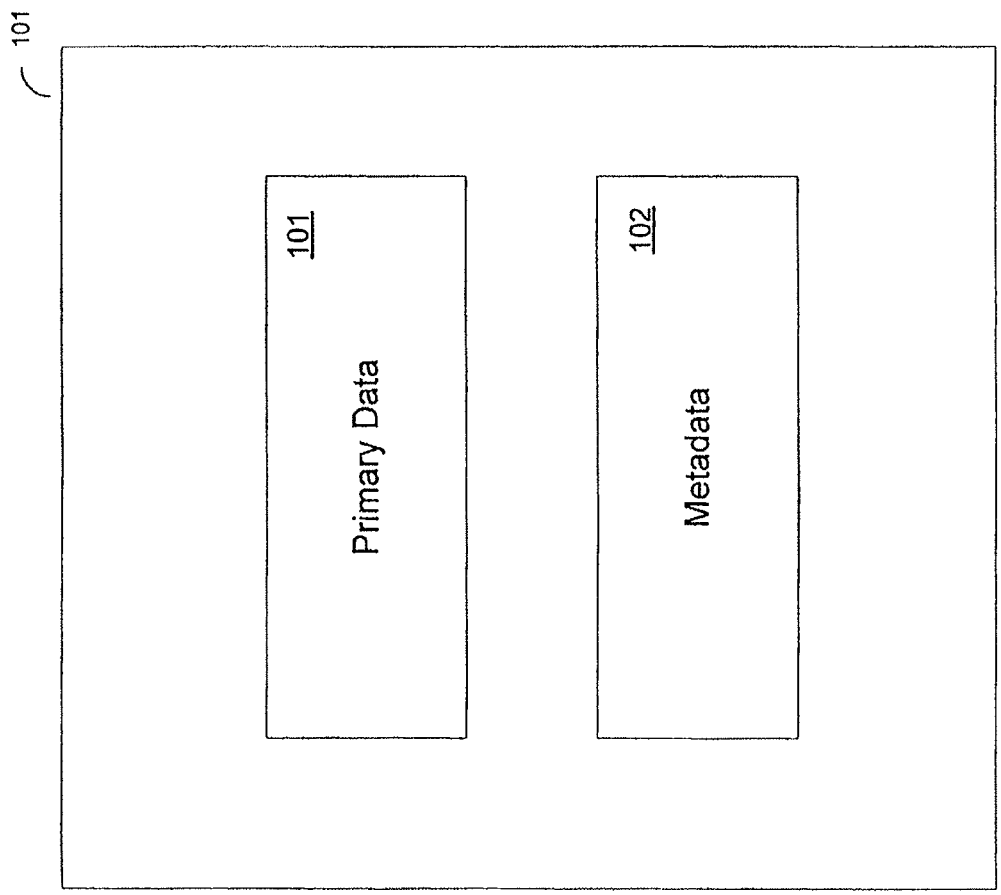
FIG. 1 is a generalized block diagram illustrating a document that may be used with the preferred embodiments.

FIG. 1 is a generalized block diagram illustrating a document 100 that may be used with the preferred embodiments. Document 100 includes primary data 101 and metadata 102. Primary data, in the presently preferred embodiment, includes the information content of the document. By way of example, a document including the play Romeo and Juliet by William Shakespeare would have as the primary data the content information, the prose and words of the play. Additionally, in the presently preferred embodiment, the primary data may include formatting data, such as data on page breaks, paragraph separation and format, text size and type, etc. In the present example metadata 102 may include the author or creator of the document, original name of the document, the time and date the document was created and/or modified, version or history information on the document, including changes made by one or multiple users with user identification, editing time, etc.

Figure 2:
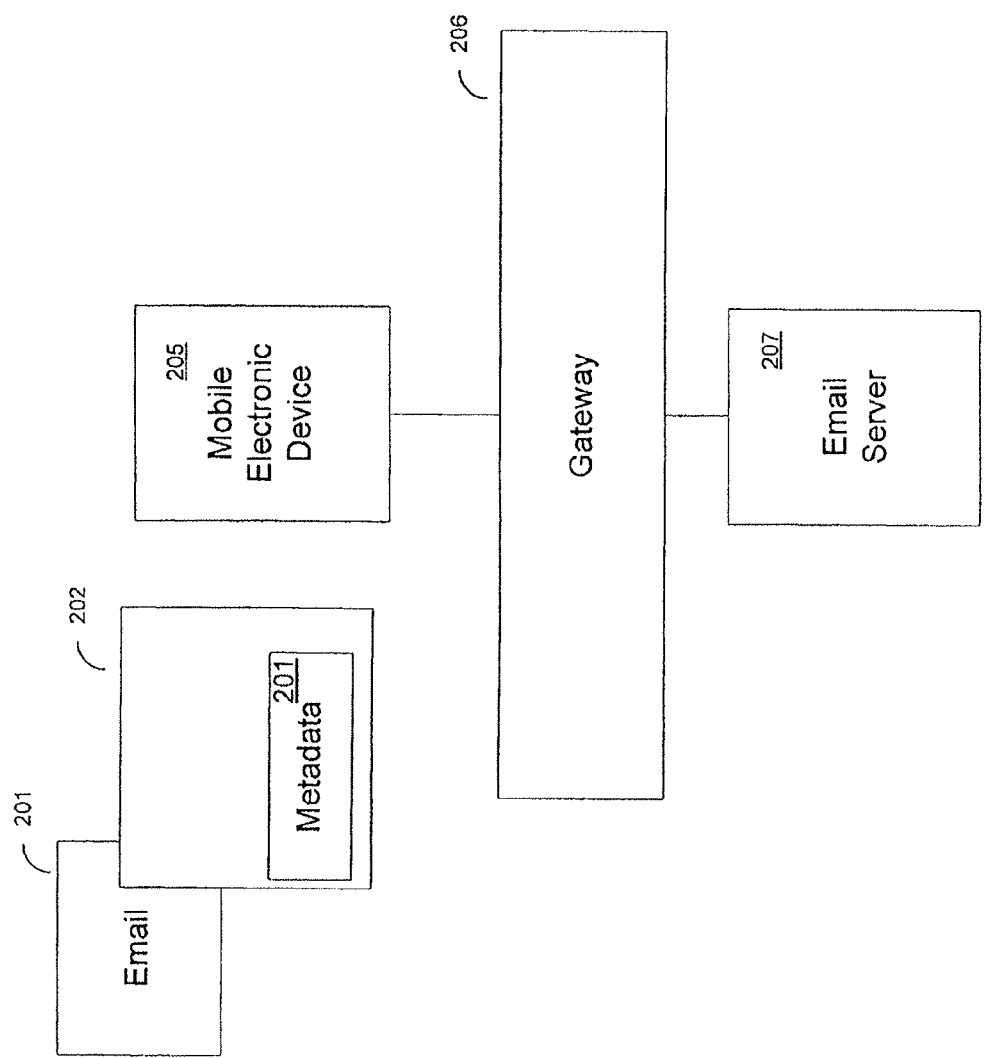
FIG. 2 is a generalized block diagram illustrating the process of removing metadata from an electronic document attached to an email, according to one possible embodiment.

FIG. 2 is a generalized block diagram illustrating the process of removing metadata 201 from an electronic document 202 attached to an email 203. The email 204 is sent from a mobile electronic device 205. In the presently preferred embodiment, electronic device is an end-user device, such as a smart phone or PDA, or other mobile electronic device capable of sending an email with an attachment. The email 203 may be sent to a gateway 206 which implements the metadata removal process described below, or the email may be sent to an email server 207, or to another program in communication with the email server. In the event the email is sent from the electronic device to the email server, the email server may send the email with the attached document to the gateway, or the email server may perform the metadata removal process. In the event the metadata removal is performed by the gateway 206, the email 203 with the attached document with the metadata removed is sent to the email server 207. Alternatively, the email with the attachment with the metadata removed may be sent from the email server if the email server performs the process of removing the metadata from the attachment. In yet another embodiment, the gateway may receive the email with the attachment from the email server, and perform the process of removing the metadata from the attachment at the gateway, and the email with the attached document with the metadata removed may be sent or forwarded by the gateway.

Figure 3:
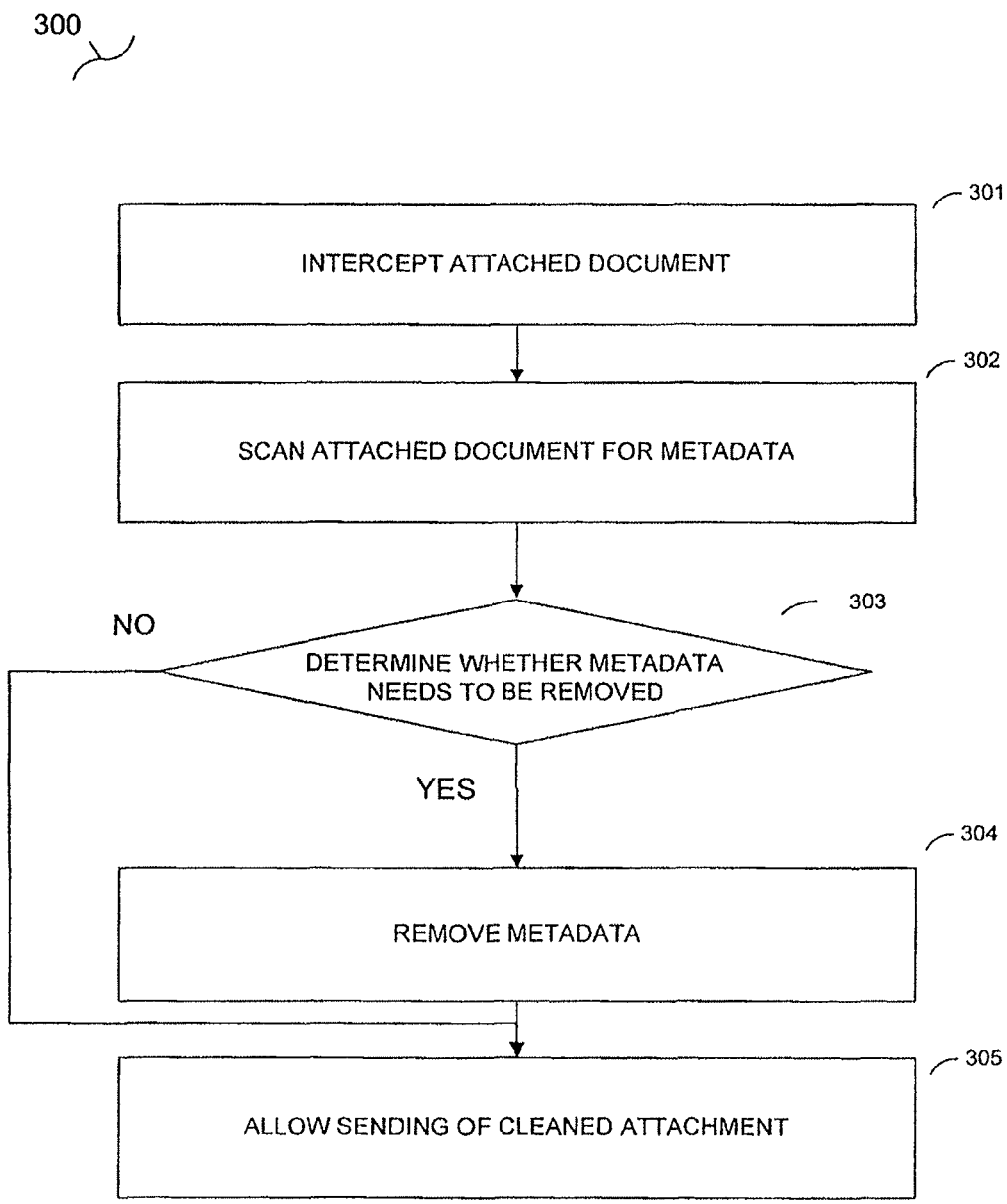
FIG. 3 is a generalized block diagram illustrating the process of removing metadata from an electronic document attached to an email, according to one possible embodiment.

FIG. 3 is a generalized block diagram illustrating the process 300 of removing metadata from an electronic document attached to an email sent from a mobile electronic device. At step 301 the email is received from the mobile electronic device. In the presently preferred embodiment, the email is received prior to the email being received by an email server, such as Microsoft Exchange Server or similar email servers. Alternate embodiments may receive the email from an email server, or the present process may be performed by an email server or computer program in communication with the email server.

At step 302 the received email is analyzed to determine whether it has an attachment. If at step 302 it is determined that the received email has an attachment, then the process proceeds to step 304. If at step 302 it is determined that the received email does not have an attachment, the process proceeds to step 303. At step 303 the email is sent according to the addressing information contained in the email. The email may be sent to an email server for sending, or if the process 300 is being performed by the email server step 303 may be the process of sending email according to the processes and protocols of the email server.

In the presently preferred embodiment, at step 304 the attached electronic document is analyzed first analyzed for document type. As an example MS OFFICE (e.g. Word), PDF, text (.txt), etc. Next, the documents are for metadata. If at step 304 the attached electronic document contains metadata that the user or administrator has selected as "to be removed" (Metadata properties can be pre configured to remove some or all metadata), then at step 305 the metadata is removed from the attached electronic document. The metadata may be removed from the attached electronic document by invoking a metadata removal application, for example: Metadata Sweeper by Liter®, Metadata Assistant by Payne OCnsulting™, iScrub by Esquire™ Innovations™, Protect by Workshare™, Out of Sight by Softwise™, etc. At step 306 a cleansed version of the attached electronic document is created from the output of step 305. In the presently preferred embodiment, the cleansed version of the attached electronic document contains all of the primary data of the electronic document, but without the metadata associated with the attached electronic document. In one alternative embodiment, step 305 removes only a portion of the metadata of the original document, the portion removed which may be configurable or in accordance with a metadata removal policy. In the presently preferred embodiment, the cleansed version of the attached electronic document has all of the same attributes, such as the ability to edit and modify the document.

At step 307 the cleansed version of the attached electronic document, or cleansed electronic document, is used to replace the attached electronic document in the received email. At step 308 the received email, with the cleansed electronic document attached, is sent. In one preferred embodiment, the email is sent to an email server, which would then handle the email according to the addressing information and instructions. In alternate embodiments the email server may have already performed the necessary sending operation and the process 300 is an after-sending check to prevent unauthorized or unwanted transmission of metadata. In another alternative embodiment, the process 300 may be performed by the email server, and step 308 may include the process of sending the email performed by the email server.

At step 309 cleansed version of the attached electronic document may be saved, either on a server, in attached or networked storage, or on the end-user's electronic device.

Alternate embodiments of the present invention may alert the end user that the attached electronic document has been cleansed prior to transmitting a cleansed version. Additionally, alerts may be sent to an admin, or a log of an attempted sending of an un-cleansed document may be stored and/or reported.

While process 300 describes the intercept of all emails with attachments, alternate embodiments could determine whether to intercept an email according to one or more policies or algorithms. For example, policies may be used to determine whether to cleanse an email according to sender, recipient, type of attachment, aspects of primary data, aspects of metadata, etc.

Figure 4:
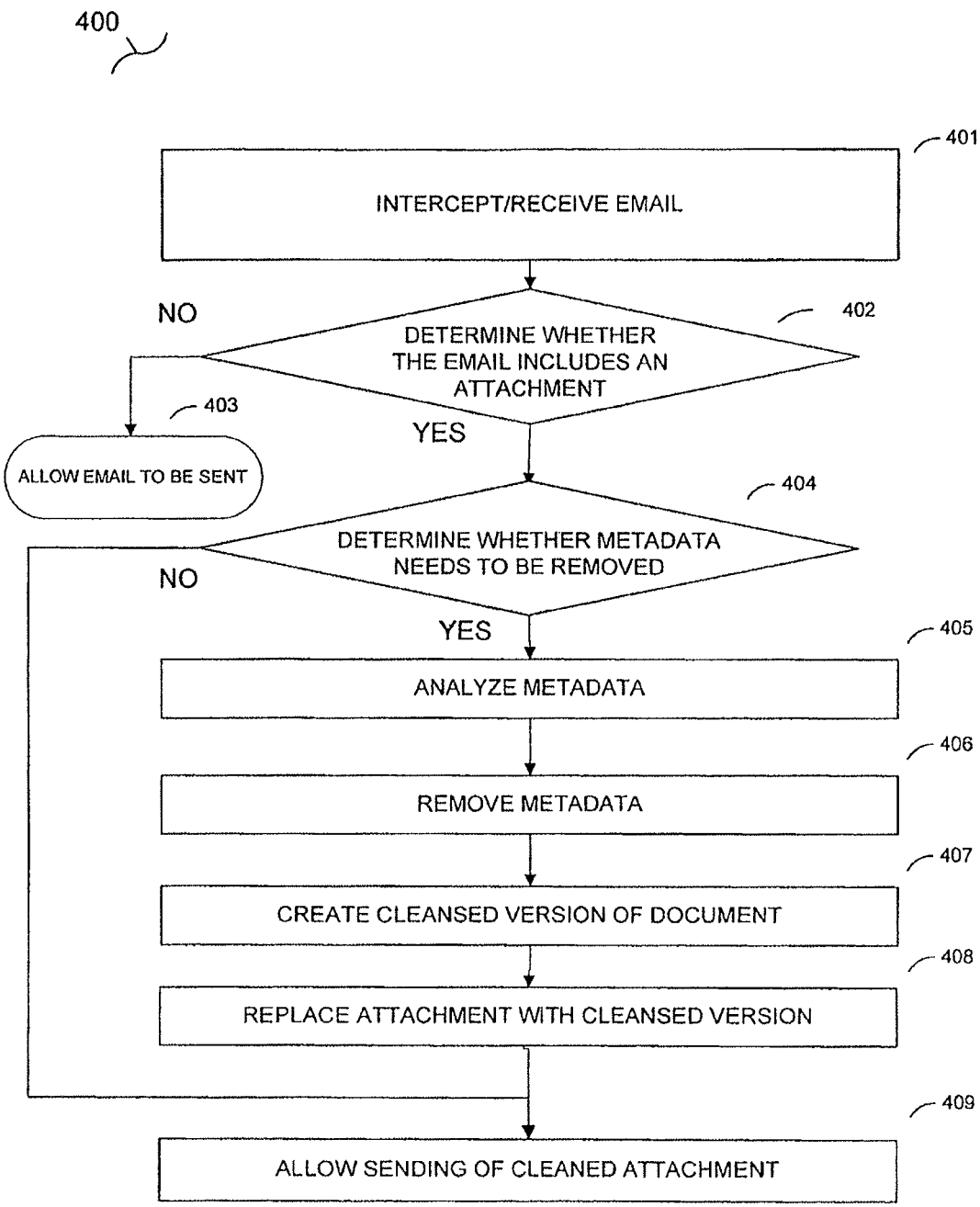
FIG. 4 is a generalized block diagram of a process of removing metadata from email attachments, according to one possible embodiment.

FIG. 4 is a generalized block diagram of a process 400 of removing metadata from email attachments. At step 401 the email is received from a mobile electronic device. In the presently preferred embodiment, the email is received prior to the email being received by an email server, such as Microsoft Exchange Server or similar email servers. Alternate embodiments may receive the email from an email server, or the present process may be performed by an email server.

At step 402 the received email is analyzed to determine whether it has an attachment. If at step 402 it is determined that the received email has an attachment, then the process proceeds to step 404. If at step 402 it is determined that the received email does not have an attachment, the process proceeds to step 403. At step 403 the email is sent according to the addressing information contained in the email. The email may be sent to an email server, or if the process 400 is being performed by the email server step 403 may include sending email according to the processes and protocols of the email server.

At step 404 the attached document is analyzed to determine whether to remove metadata from the attached document. A cleansing policy is compared to the information obtained from analyzing the attached document to determine whether the attached document is to be cleansed prior to sending the document. The cleaning policy may specify certain types of metadata such as document properties, specific aspects of metadata, for example specific authors, titles, etc., or any other type of metadata that may be included in a document.

If at step 404 the determination is made that the attached document is not to be cleansed, i.e., the attached document will not have metadata removed, then the process proceeds to step 409 where the email with the attached document is sent.

If at step 404 the determination is made to cleanse the attached document, then the process proceeds to step 405 where the attached electronic document is analyzed for metadata. If at step 405 the attached electronic document contains metadata, then at step 406 the pre specified (ether as a default preference, a configured preference, etc.) metadata is removed from the attached electronic document. The metadata may be removed from the attached electronic document by invoking a metadata removal application, such as the examples listed above or other such programs. At step 407 a cleansed version of the attached electronic document is created from the output of step 406. In the presently preferred embodiment, the cleansed version of the attached electronic document contains all of the primary data of the electronic document, but without the metadata associated with the attached electronic document. In the presently preferred embodiment, the cleansed version of the attached electronic document has all of the same attributes, such as the ability to edit and modify the document.

At step 408 the cleansed version of the attached electronic document, or cleansed electronic document, is used to replace the attached electronic document in the received email. At step 409 the received email, with the cleansed electronic document attached, is sent. In one preferred embodiment, the email is sent to an email server, which would then handle the email according to the addressing information and instructions. In alternate embodiments the email server may have already performed the necessary sending operation and the process 400 is an after-sending check to prevent unauthorized or unwanted transmission of metadata. In another alternative embodiment, the process 400 may be performed by the email server, and step 409 may include the process of sending the email performed by the email server.

At step 410 cleansed version of the attached electronic document may be saved, either on a server, in attached or networked storage, or on the end-user's electronic device.

Alternate embodiments of the present invention may alert the end user that the attached electronic document has been cleansed prior to transmitting a cleansed version. Additionally, alerts may be sent to an admin, or a log of an attempted sending of an un-cleansed document may be stored and/or reported. Still other embodiments may include seeking confirmation from a person (the sender, an administrator, or another) before cleaning and replacing the attached document, or before sending a cleansed version of the attached document.

While process 300 and 400 were described in the context of a single attachment of an email, multiple attachments, either of the same document type or of multiple document types, may be analyzed and cleansed prior to sending an email.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

I claim:

1. A computer-based system for cleaning metadata from electronic documents, comprising:

an intermediate computer that is remote from a mobile electronic device sending a message, the intermediate computer including a memory storing instructions; and
a processor configured to:
execute the instructions to intercept the message sent from the mobile electronic device at the intermediate computer,
execute the instructions to determine that an electronic document attached to the message includes a pre-determined type of metadata,
execute the instructions to automatically remove at least a portion of the pre-determined type of metadata from the attached electronic document,
execute the instructions to create a cleansed version of the attached electronic document, and
execute the instructions to send the message with one of the attached electronic document having the pre-determined type of metadata removed or the cleansed version of the attached electronic document.

2. The system of claim 1, wherein the processor is further configured to
execute the instructions to replace in the message the attached electronic document with the cleansed version of the attached electronic document.

3. The system of claim 1, wherein the processor is further configured to execute the instructions to save the cleansed version of the attached electronic document.

4. The system of claim 1, wherein the cleansed version of the attached electronic document is an RTF document, a PDF document, a word-processing document, a spreadsheet, a presentation document a diagram document, or a web page document.

5. A non-transitory computer-readable storage medium storing instructions for cleaning metadata from an electronic document, the instructions causing one or more computer processors to perform operations comprising:
intercepting, at an intermediate computer that is remote from a mobile electronic device, a message sent from the mobile electronic device;
determining that an electronic document attached to the message includes a pre-determined type of metadata;
automatically removing at least a portion of the pre-determined type of metadata from the attached electronic document;
creating a cleansed version of the attached electronic document; and
sending the message with one of the attached electronic document having the pre-determined type of metadata removed or the cleansed version of the attached electronic document.

6. The storage medium of claim 5, wherein the instructions cause the processor to further perform the operations of
replacing in the message the attached electronic document with the cleansed version of the attached electronic document.

7. The storage medium of claim 6, wherein the instructions cause the processor to further perform the operation of saving the cleansed version of the attached electronic document.

8. A computer-based system for preventing unauthorized transmission of metadata in electronic documents, comprising:
an intermediate computer that is remote from an electronic device sending a message, the intermediate computer including a memory storing instructions; and
a processor configured to:
execute the instructions to receive the message having a delivery address and an attached electronic document sent from the electronic device, the attached electronic document including primary data and metadata, execute the instructions to remove at least a portion of the metadata from the attached electronic document, execute the instructions to create a cleansed version of the attached electronic document, and execute the instructions to transmit the message, including one of the attached electronic document that has had the metadata removed or the cleansed version of the attached electronic document, to a destination associated with the delivery address.

9. The system of claim 8, wherein the processor is further configured to, when removing the metadata, execute the instructions to remove only pre-determined types of metadata.

10. The system of claim 8, where the processor is further configured to execute the instructions to obtain confirmation before transmitting the message.

11. The system of claim 8, wherein the processor is further configured to execute the instructions to generate an alert before transmitting the message.

12. The system of claim 8, wherein the processor is further configured to:

execute the instructions to request permission to remove the metadata prior to removing the metadata; and execute the instructions to transmit the message with the attached electronic document that includes the metadata when the permission is denied.

13. The system of claim 8, wherein the electronic device includes a smart phone, a personal digital assistant, a tablet, or a web-mail server.

14. The system of claim 13, wherein the processor is further configured to, when transmitting the message, execute the instructions to forward the message to an email server.

15. The system of claim 8, wherein the processor is further configured to, when transmitting the message, execute the instructions to transmit the message according to delivery instructions.

16. The system of claim 8, wherein the computer system comprises a series of computers.

17. The system of claim 8, wherein the processor is further configured to:

execute the instructions to determine that the metadata includes a pre-specified type of metadata and responsive thereto, the processor does not execute the instructions to perform the removal operation.

18. The system of claim 8, wherein the processor is further configured to, when removing the metadata from the attached document, execute the instructions to remove only pre-specified types of metadata in accordance with a cleansing policy.

19. A non-transitory computer-readable storage medium storing instructions for preventing unauthorized transmission of metadata in electronic documents, the instructions causing one or more computer processors to perform operations comprising:

receiving, at an intermediate computer that is remote from an electronic device, a message sent from the electronic device, the message having a delivery address and an attached electronic document including primary data and metadata;

removing at least a portion of the metadata from the attached electronic document;

creating a cleansed version of the attached electronic document, and transmitting the message, including one of the attached electronic document that has had the metadata removed or the cleansed version of the attached electronic document, to a destination associated with the delivery address.

20. The storage medium of claim 19, wherein the instructions cause the processor, when removing the metadata, to further perform the operation of removing only pre-determined types of metadata.

21. The storage medium of claim 19, wherein the electronic device includes a smart phone, a personal digital assistant, a tablet, or a web-mail server.

22. The storage medium of claim 21, wherein the instructions cause the processor, when transmitting the message, to further perform the operation of forwarding the message to an email server.

23. The storage medium of claim 19, wherein the instructions cause the processor, when transmitting the message, to further perform the operation of transmitting the message according to delivery instructions.

24. The storage medium of claim 19, wherein the computer system comprises a series of computers.

25. The storage medium of claim 19, wherein the instructions cause the processor, when removing the metadata from the attached document, to further perform the operation of removing only pre-specified types of metadata in accordance with a cleansing policy.

26. An intermediate computer-based system for cleaning metadata from electronic documents, the intermediate computer-based system being remote from a mobile electronic device configured to send messages and comprising:

a memory storing instructions; and a processor configured to:

execute the instructions to receive a message associated with a destination address and sent from the remote mobile electronic device, execute the instructions to determine that an electronic document attached to the message includes a pre-determined type of metadata, execute the instructions to remove the pre-determined type of metadata from the attached electronic document, execute the instructions to create a cleansed version of the attached electronic document, and execute the instructions to send, to the destination address, the message with one of the attached electronic document having the pre-determined type of metadata removed or the cleansed version of the attached electronic document.

27. The intermediate computer-based system of claim 26, wherein the processor is further configured to:

execute the instructions to request, prior to removing the pre-determined type of metadata, confirmation from the user of the mobile electronic device that the pre-determined type of metadata should be removed.

28. The intermediate computer-based system of claim 26, wherein the processor is further configured to:

execute the instructions to enable the user of the mobile electronic device to configure preferences for determining the predetermined type of metadata to be removed.

29. The intermediate computer-based system of claim 28, wherein the predetermined type of metadata is less than all of the metadata in the electronic document.

30. The intermediate computer-based system of claim 26, wherein the intermediate computer-based system is an e-mail server.

* * * * *